US012303919B2

(12) United States Patent
Fu

(10) Patent No.: US 12,303,919 B2
(45) Date of Patent: May 20, 2025

(54) WATER OUTLET STRUCTURE ALLOWING A NOZZLE TO GENERATE DIFFERENT SPRAY PATTERNS AND WATER OUTLET DEVICE USING THE SAME

(71) Applicant: XIAMEN SUITEC SANITARY WARES & FITTINGS CO., LTD., Xiamen (CN)

(72) Inventor: Zhiyu Fu, Xiamen (CN)

(73) Assignee: XIAMEN SUITEC SANITARY WARES & FITTINGS CO., LTD., Xiamen (CN)

( * ) Notice: Subject to any disclaimer, the term of this patent is extended or adjusted under 35 U.S.C. 154(b) by 393 days.

(21) Appl. No.: 18/089,553

(22) Filed: Dec. 27, 2022

(65) Prior Publication Data

US 2023/0201847 A1 Jun. 29, 2023

(30) Foreign Application Priority Data

Dec. 29, 2021 (CN) ......................... 202111649589.4

(51) Int. Cl.

| | |
|---|---|
| ***B05B 1/18*** | (2006.01) |
| ***B05B 1/12*** | (2006.01) |
| ***B05B 1/16*** | (2006.01) |

(52) U.S. Cl.

CPC ................ *B05B 1/185* (2013.01); *B05B 1/12* (2013.01); *B05B 1/1627* (2013.01)

(58) Field of Classification Search

CPC .. B05B 1/18; B05B 1/185; B05B 1/12; B05B 1/16; B05B 1/1627; B05B 1/34; B05B 1/341; B05B 1/3478

See application file for complete search history.

(56) References Cited

U.S. PATENT DOCUMENTS

| | | | | |
|---|---|---|---|---|
| 2018/0243764 A1* | 8/2018 | Lin | ........................... | B05B 1/16 |
| 2019/0283048 A1* | 9/2019 | Rong | ........................ | B05B 1/12 |
| 2020/0222918 A1* | 7/2020 | Grigor | .................... | B05B 1/185 |
| 2021/0121897 A1* | 4/2021 | Lin | ....................... | B05B 12/002 |

* cited by examiner

*Primary Examiner* — Darren W Gorman

(57) ABSTRACT

A water outlet structure allowing a nozzle to generate different spray patterns and a water outlet device using the water outlet structure are provided. The water outlet structure includes: a housing, a water outlet cover, a water dispersion assembly, a water separation assembly, a water oblique assembly, and a switching assembly. At least two water inlet holes are defined through the housing. The water outlet cover is connected to the housing, and a plurality of water outlet portions are defined through the water outlet cover. The water dispersion assembly includes a first water dispersion hole and a second water dispersion hole. The water separation assembly directs pressurized water into a first chamber or a second chamber. The water oblique assembly forms the first chamber with the water separation assembly, and forms the second chamber with the water outlet cover.

10 Claims, 10 Drawing Sheets

WATER OUTLET STRUCTURE ALLOWING A NOZZLE TO GENERATE DIFFERENT SPRAY PATTERNS AND WATER OUTLET DEVICE USING THE SAME

TECHNICAL FIELD

The present disclosure relates to a water outlet device, in particular to a water outlet structure allowing a nozzle to generate different spray patterns and a water outlet device using the water outlet structure.

BACKGROUND

In the field of water usage, water outlet components are required to have different water outlet effects to suit various users' needs. For example, some users prefer straight-flow water, while some others prefer granular water. In order to meet the needs, water usage components with a water outlet structure that allows a nozzle to generate different spray patterns have emerged. However, a water guide structure in some of these conventional water usage components is relatively complex. A single water usage component having a complex structure leads to a high tooling cost during a manufacturing process, thereby resulting in a high cost for a finished product.

SUMMARY

The present disclosure provides a water outlet structure allowing a nozzle to generate different spray patterns, which effectively solves the foregoing problems.

According to the present disclosure, the water outlet structure allowing a nozzle to generate different spray patterns includes a housing, a water outlet cover, a water dispersion assembly, a water separation assembly, a water oblique assembly, and a switching assembly.

At least two water inlet holes are defined through the housing.

The water outlet cover is connected to the housing, and a plurality of water outlet portions are defined through the water outlet cover.

The water dispersion assembly includes a first water dispersion hole in communication with a first water inlet hole, and a second water dispersion hole in communication with a second water inlet hole.

The water separation assembly is configured to direct pressurized water into a first chamber or into a second chamber.

The water oblique assembly forms the first chamber with the water separation assembly, and forms the second chamber with the water outlet cover.

The water oblique assembly includes a straight flow region and an oblique flow region disposed on a same plane. The pressurized water flows into the water separation assembly through the second water dispersion hole, directly flows into the second chamber through the straight flow region, and flows out from the water outlet portions through the second chamber, to form a first water flow. The pressurized water flows into the water separation assembly through the first water dispersion hole, flows into the oblique flow region through the first chamber, swirls inside of the water outlet portions after flowing through the oblique flow region, and flows out from the water outlet portions, to form a second water flow. The pressurized water enters the first chamber and the second chamber respectively through the first water dispersion hole and the second water dispersion hole, swirling water after flowing through the oblique flow region and straight-flow water after flowing through the straight flow region and flow out from the water outlet portions, to form a third water flow.

The switching assembly is configured to selectively direct the pressurized water into the water inlet holes.

Optionally, the oblique flow region includes a plurality of oblique flow groups. Each of the plurality of the oblique flow groups includes two or more water oblique holes. The water oblique holes are defined obliquely with respect to a water outlet surface or a horizontal plane and point to an end of the water outlet portions.

Optionally, the water oblique holes are arranged in a staggered manner, and a water outlet end of each of the plurality of the oblique flow groups is in communication with one of the water outlet portions.

Optionally, a pillar is disposed between the water oblique holes of each of the plurality of the oblique flow groups and vertical to the water oblique assembly. An axis of the pillar and an axis of the water outlet portion corresponding to the oblique water group lie on a same straight line.

Optionally, at least a plurality of water inlet notches in communication with the second chamber are defined at water inlet ends of the water outlet portions.

Optionally, water inlet areas of the water oblique holes are larger than areas of water outlet holes of the water outlet portions.

Optionally, the water dispersion assembly includes a partition piece. The partition piece is closely attached to the water separation assembly, to form an accommodation space. The first water dispersion hole is defined inside the accommodation space, and the second water dispersion hole is defined outside the accommodation space.

Optionally, the water separation assembly includes a plurality of first water separation holes and a plurality of second water separation holes. The first water separation holes are defined in an orthographic projection area of the accommodation space, and the second water separation holes are defined outside the orthographic projection area of the accommodation space and configured to receive water entering through the second water inlet hole.

Optionally, the switching assembly includes a water distributor, disposed at a water inlet end of the housing; and an on-off switch, configured to activate the water distributor. The on-off switch is configured to rotate or move the water distributor, so as to allow the water distributor to selectively direct water at the water inlet end into either of the water inlet holes or both of the water inlet holes.

The present disclosure further provides a water outlet device, including the water outlet structure according to any one of the foregoing embodiments, and a connection housing. The switching assembly is disposed in the connection housing, and is configured to control the water outlet structure to jet different spray patterns.

The present disclosure has following beneficial effects:

According to the present disclosure, the water is directed to different water inlet holes via the switching assembly, so that the water directly comes out through different chambers or comes out through a plurality of chambers at the same time. Through distributing the water flow among the plurality of chambers, the water may come out in different states, thereby meeting different users' needs.

The present disclosure simplifies structures. Each of the water guide structures and the water dispersion structures is a separate one. The water oblique assembly, the water outlet cover, and the water separation assembly all have simple structures, which makes the tooling cost for each structure relatively low. This reduces the overall cost of the water outlet structure, thereby allowing it to have a competitive advantage in the market.

BRIEF DESCRIPTION OF DRAWINGS

In order to more clearly illustrate technical solutions of embodiments of the present disclosure, drawings used in the embodiments are briefly described below. It is appreciated that the drawings below merely show some embodiments of the present disclosure, and thus should not be regarded as a limitation of the scope. Those skilled in art obtain other related drawings from these drawings without creative thinking.

DETAILED DESCRIPTION

Figure 1:
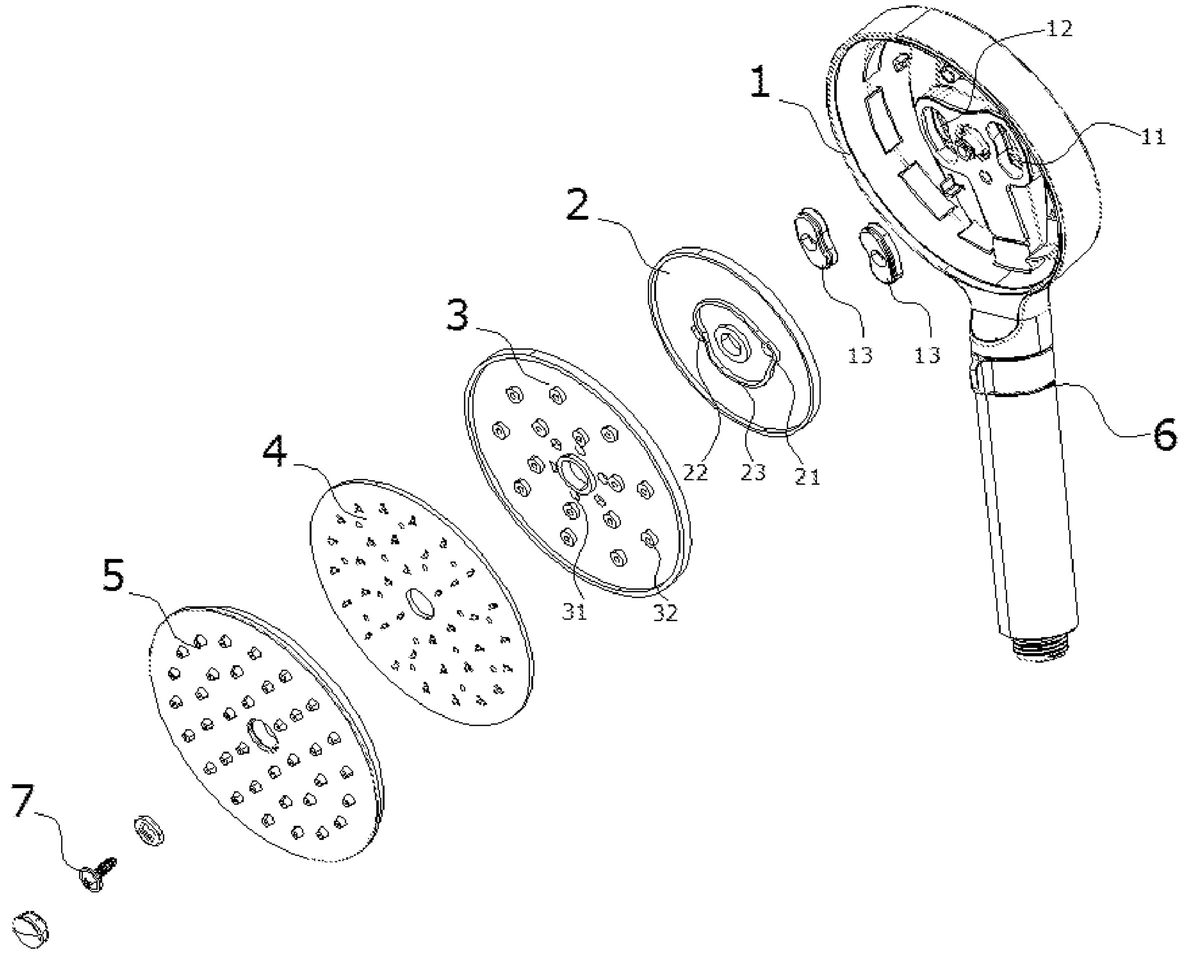
FIG. 1 is an exploded schematic diagram of a water outlet structure allowing a nozzle to generate different spray patterns according one embodiment of the present disclosure.

All embodiments of the present disclosure fall within a protection scope of the present disclosure. The following detailed description of the embodiments of the present disclosure provided in drawings is not intended to limit the scope of the present disclosure, but merely represents selected embodiments of the present disclosure. Based on the embodiments of the present disclosure, all other embodiments obtained by those skilled in art without any creative thinking belong to the scope of protection of the present disclosure.

Terms "first" and "second" herein are merely used for description, and cannot be understood as referring to the purpose, technical solutions and advantages of the method more clearly. The technical solutions in the embodiments of the present disclosure will be clearly and completely described with reference to the accompanying drawings. Obviously, the described embodiments are merely a part of embodiments of the present disclosure, not all of them. Based on the embodiments of the present disclosure, all other embodiments obtained by those skilled in the art without any creative thinking fall within the scope of protection of the present disclosure. Thus, features limited by the terms "first" and "second" may explicitly or implicitly include one or more of the features. In the description of the present disclosure, the meaning of "a plurality of" refers to two or more, unless specifically defined otherwise.

Referring to FIG. 1 to FIG. 10, a water outlet structure allowing a nozzle to generate different spray patterns includes: a housing 1, a water dispersion assembly 2, a water separation assembly 3, a water oblique assembly 4, a water outlet cover 5 and a switching assembly 6. A mounting hole is defined in each of the water dispersion assembly 2, the water separation assembly 3, the water oblique assembly 4 and the water outlet cover 5. A mounting seat is disposed at an axis of the housing 1. The water outlet cover 5 is connected to a screw 7. The screw 7 locks the water outlet cover 5 to the housing 1 by a gasket, and is clamped by a screw cover. At least two water inlet holes are defined though the housing 1. A plurality of water outlet portions 51 are defined though the water outlet cover 5. At least two water inlet notches 511 in communication with a second chamber are defined at a water inlet end of the water outlet portion 51. The switching assembly 6 is configured to selectively direct water into different water inlet holes.

Referring to FIG. 1, in order to limit water inlet areas of the water inlet holes, a corresponding number of cateye gaskets 13 are disposed to the water inlet holes, so as to adapt to shapes of the water inlet holes, thereby limiting pressurized water entering through the water inlet holes.

An accommodation space is formed between the housing 1 and the water outlet cover 5. Inside the accommodation space, there are the water dispersion assembly 2 connected to the water inlet holes, and the water separation assembly 3 tightly sealed on a water outlet side of the water dispersion assembly 2. The water oblique assembly 4 is disposed on a water outlet side of the water separation assembly 3, and the water oblique assembly 4 is attached to the water outlet cover 5. After external pressurized water is directed by the switching assembly 6, the external pressurized water enters the water dispersion assembly 2 through the water inlet hole(s) of the housing 1. There are three water inlet situations. The first one is water entering only through the first water inlet hole 11; the second one is water entering only through the second water inlet hole 12; and the third one is water entering through the first water inlet hole 11 and the second water inlet hole 12 at the same time. Correspondingly, the three water inlet situations lead to three situations of water flow respectively.

A first water dispersion hole 21 and a second water dispersion hole 22 are defined through the water dispersion assembly 2 respectively. The first water dispersion hole 21 is in communication with the first water inlet hole 11, and the second water dispersion hole 22 is in communication with the second water inlet hole 12. In addition, a partition piece 23 is disposed between the first water dispersion hole 21 and the second water dispersion hole 22, to separate the first water dispersion hole 21 from the second water dispersion hole 22. The first water dispersion hole 21 is defined inside the partition piece 23, and the second water dispersion hole 22 is defined outside the partition piece 23. In a case that water enters through the first water dispersion hole 21, there is no water overflowing to a position of the second water dispersion hole 22 due to the barrier effect of the partition piece 23. Similarly, in a case that water enters through the second water dispersion hole 22, there is no water overflowing to a position of the first water dispersion hole 21 due to the barrier effect of the partition piece 23. As such, the two water dispersion holes have water dispersion paths that are in non-interference with each other and relatively independent of each other.

Correspondingly, first water separation holes 31 and second water separation holes 32 are defined through the water separation assembly 3 disposed on the water outlet side of the water dispersion assembly 2. In a case that the water dispersion assembly 2 is closely attached to the water separation assembly 3, a closed space is formed between the partition piece 23 and the water separation assembly 3. The first water separation holes 31 are defined annularly inside the closed space, and are in direct communication with the first water dispersion hole 21. The second water separation holes 32 are defined outside the closed space, and also inside an inner cavity formed by the water dispersion assembly 2 and the water separation assembly 3. In order to make outlet water more uniform, the second water separation holes 32 are distributed in the water separation assembly 3 in an annular array.

Through the foregoing water dispersion and water separation, in a case that water enters through the first water inlet hole 11 and the second water inlet hole 12 at the same time, two streams of water flow are formed. The water oblique assembly 4, which is attached to the water outlet side of the water separation assembly 3, divides the whole of the water outlet portions 51 into two chambers. A first chamber is a chamber formed by the water oblique assembly 4 and the water separation assembly 3, and a second chamber is a chamber formed by the water oblique assembly 4 and the water outlet cover 5.

Figure 2:
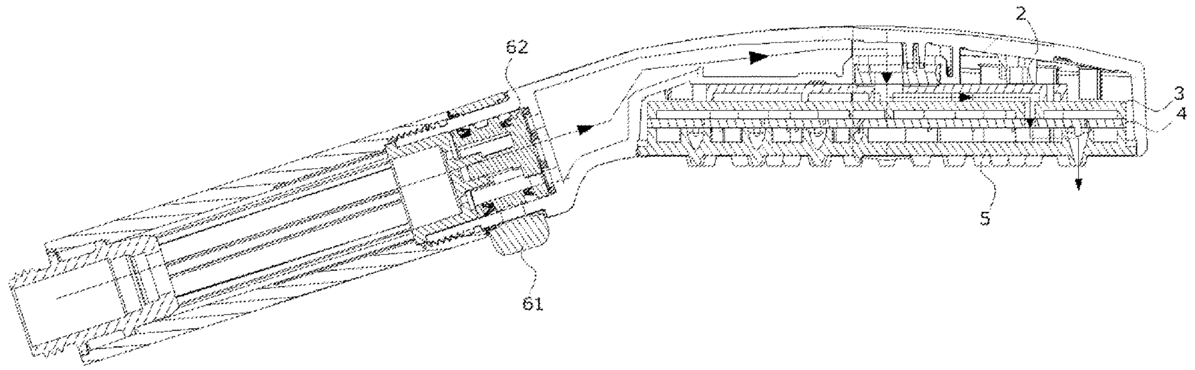
FIG. 2 is a schematic diagram of a first water flow path of the water outlet structure allowing the nozzle to generate different spray patterns according one embodiment of the present disclosure.

Referring to FIG. 2, the water oblique assembly 4 includes a straight flow region B and an oblique flow region A. The straight flow region B includes a plurality of straight holes 41 in one-to-one correspondence to the second water separation holes 32. After water enters through the second water inlet hole 12, the water flows into the water separation assembly 3 through the second water dispersion hole 22, and then is uniformly directed out through the second water separation holes 32 of the water separation assembly 3. Since the second water separation holes 32 are in direct communication with the plurality of straight holes 41 in the straight flow region B, the pressurized water directly flows into the second chamber instead of staying in the first chamber. The water flowing into the second chamber is directly directed out from the water outlet portions 51 along the water inlet notches 511 of the water outlet portions 51, to form a first water flow, which is in the form of shower water.

Figure 3:
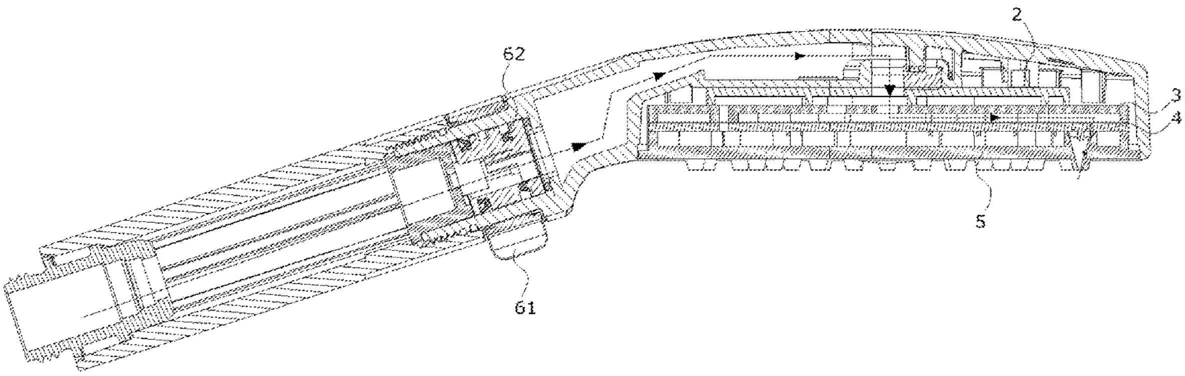
FIG. 3 is a schematic diagram of a second water flow path of the water outlet structure allowing the nozzle to generate different spray patterns according one embodiment of the present disclosure.

Referring to FIG. 3, the oblique flow region A on the water oblique assembly 4 includes a plurality of oblique flow groups. Each of the plurality of the oblique flow groups includes at least two or more water oblique holes 42. After water enters through the first water inlet hole 11, the water flows into the water separation assembly 3 through the first water dispersion hole 21. Due to the barrier effect of the partition piece 23, the pressurized water is uniformly directed out along the first water separation holes 31. The pressurized water flowing out from the first water separation holes 31 impacts over the entire water oblique assembly 4, and spreads in the first chamber. In this case, a part of the pressurized water flows out along the water oblique holes 42. In addition, each of the plurality of the oblique flow groups corresponds to one water outlet portion 51. The water flowing out from the water oblique holes 42 swirls inside of the water outlet portions 51 and then is directed out, to form a second water flow, which is in the form of mist spray water.

In view of the foregoing description of each assembly, the housing 1 may be a conventional housing, the water dispersion assembly 2 plays the role of dispersing the water flow, the water separation assembly 3 plays the role of separating different forms of water flow, the water oblique assembly 4 plays the role of generating oblique water, and the water outlet cover 5 plays the role of generating straight water. Each structure produces a separate effect, and a combination of these structures produces linkage effects. Each structure is relatively simple, and thus is easy for mold designing and manufacturing. In the related art, the same structure is used to generate both the straight water and the oblique water. If the same structure integrated with a plurality of functions is used, it is difficult to design the mold and manufacture for each single structure, which increases the production cost and thereby driving the corresponding price up.

In order to realize the swirling effect, there are at least two water oblique holes 42. In other embodiments, there are three or four water oblique holes 42. The water oblique holes 42 are oblique to a horizontal plane. The pressurized water is directed to have an angle with respect to a cone surface on an inner side of the water outlet portion 51 only in a case that the water oblique holes 42 are oblique. After collision, the two streams of water swirl along the inner cone surface of the water outlet portion 51, so as to realize the effect of mist spray water. Preferably, the angle between the water oblique hole 42 and the horizontal plane is 25° to 80°. If the oblique angle is larger than 80°, an included angle between the water flowing out of the water oblique holes 42 and the inner cone surface of the water outlet portion 51 is too small, so that the water stays inside the water outlet portion 51 for a short time, which shortens the time for the two streams of water flow to meet, thereby making it difficult for the discharged water flow to shape. If the oblique angle is smaller than 25°, the water flow flowing out of the water oblique holes 42 collides with the inner conical surface of the water outlet portion 51, so that the impact of the water flow is partially offset by the water outlet portion 51, which reduces the water outlet pressure, thereby adversely affecting the water outlet effect.

The premise of realizing the swirling effect is that the two water oblique holes 42 must be staggered with each other. If the two are facing each other, the two streams of water flow collide with each other before each collides with the inner side of the water outlet portion 51. This will make it difficult to shape the spray pattern, resulting in an irregular spay pattern, and at the same time affect the water pressure.

Figure 6:
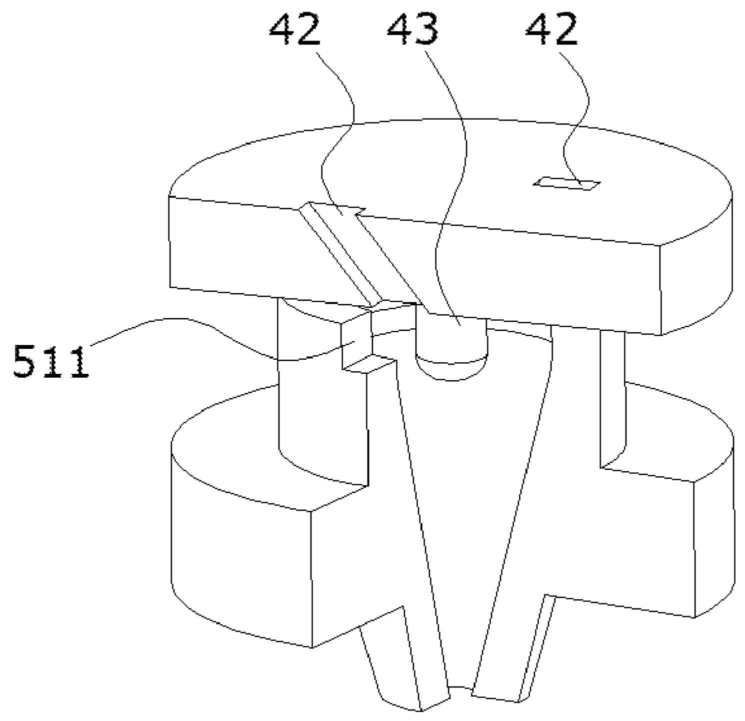
FIG. 6 is a structural schematic diagram showing the water oblique assembly cooperating with a water outlet cover according one embodiment of the present disclosure.

However, in a case that water comes out through the water oblique holes 42, although the two are staggered with each other, uncertainty of the water flow may easily cause turbulent flow, which consumes internal energy in the water outlet portion 51, thereby reducing the water outlet pressure. In order to avoid this situation, a pillar 43 is disposed between the two water oblique holes 42. Referring to FIG. 6, an axis of the pillar 43 and an axis of the water outlet portion 51 corresponding to the oblique water group lie on the same straight line, and the two water oblique holes 42 are symmetrical with respect to a position center of the pillar 43. In this way, the pillar 43 prevents the streams of water flow flowing through the two water oblique holes 42 at the same time from colliding with each other to form turbulent flow, and directs the streams of water flow ejected from the water oblique holes 42.

In order to ensure the water outlet pressure, in an embodiment, an aperture of the water oblique hole 42 is consistent at a water inlet end and a water outlet end thereof. In other embodiments, the aperture of the water oblique hole 42 may be gradually reduced along a direction of the water flow, thereby increasing the pressure of the pressurized water.

Even if there is no change to the aperture of the water oblique hole 42, in order to ensure an overall pressure, water inlet areas of the water oblique hole 42 are larger than areas of water outlet holes of the water outlet portions 51. The change from a large area to a small area produces a suction force, so as to suck out scale or other debris in the housing 1, which avoids deposition in the accommodation space of the housing 1 from affecting the water flow.

Through the foregoing processes, the pressurized water swirls after flowing through the water oblique holes 42, and then the water flow turns into mist spray water. At this time, the pressurized water also needs to pass through the water outlet cover 5, so as to be discharged outside. During this process, if the pressurized water enters the second chamber formed by the water outlet portions 51 and the water oblique assembly 4, the swirling action of the oblique flow will lose its function. In order to prevent the swirling pressurized water flows into the second chamber, a water outlet end of each of the plurality of the oblique flow groups is in communication with one water outlet portion 51. In this way, the water after flowing obliquely is discharge separately, without being mixed again.

In the first chamber, a part of the water may flow out through the straight holes 41 in the straight flow region B. However, it is seen from FIG. 1 that each of the second water separation holes 32 of the water separation assembly 3 has a separate cylinder structure. That is, in a case that the water separation assembly 3 is cooperated with the water oblique assembly 4, the second water separation holes 32 directly abut against the straight holes 41 in the straight flow region B. As such, in a first water flow state, the first water flow does not overflow to the oblique flow region A; and in a second water flow state, the second water flow does not overflow to the straight flow region B due to the barrier of the cylinders. Thus, the first water flow and the second water flow do not affect each other.

Figure 4:
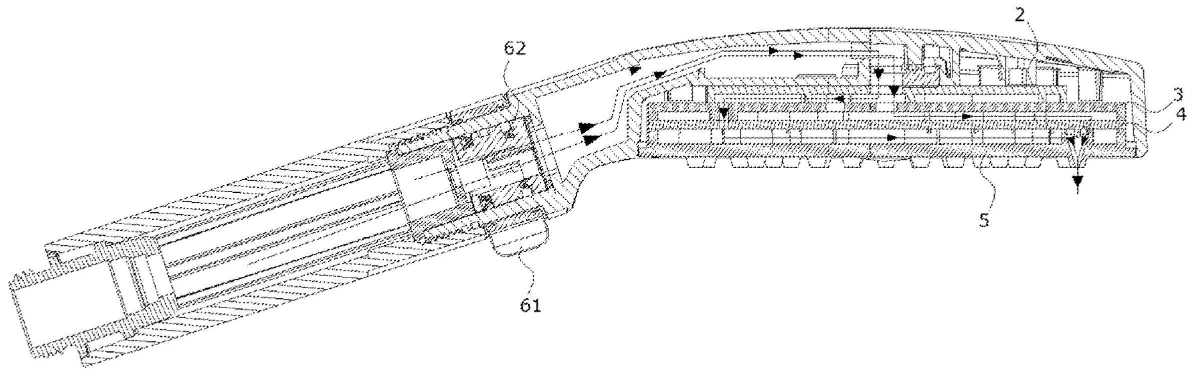
FIG. 4 is a schematic diagram of a third water flow path of the water outlet structure allowing the nozzle to generate different spray patterns according one embodiment of the present disclosure.

Referring to FIG. 4, in a case that water enters through the first water inlet 11 and the second water inlet 12 at the same time, the pressurized water enters through the first water dispersion hole and the second water dispersion hole at the same time. In addition, the pressurized water enters through the first water separation holes 31 and the second water separation holes 32 of the water separation assembly 3, and then flows into the first chamber and the second chamber at the same time. In this case, the pressurized water has two flow paths. In the first flow path, the pressurized water directly enters the second chamber, and flows out through the water inlet notches 511 of the water outlet portions 51. In the second flow path, the pressurized water enters the water outlet portions 51 through the oblique flow process of the oblique water assembly 4. The straight-flow water and the swirling water entering the water outlet portions 51 at the same time mix with each other to form a third water flow, which is in the form of granular water.

Figure 5:
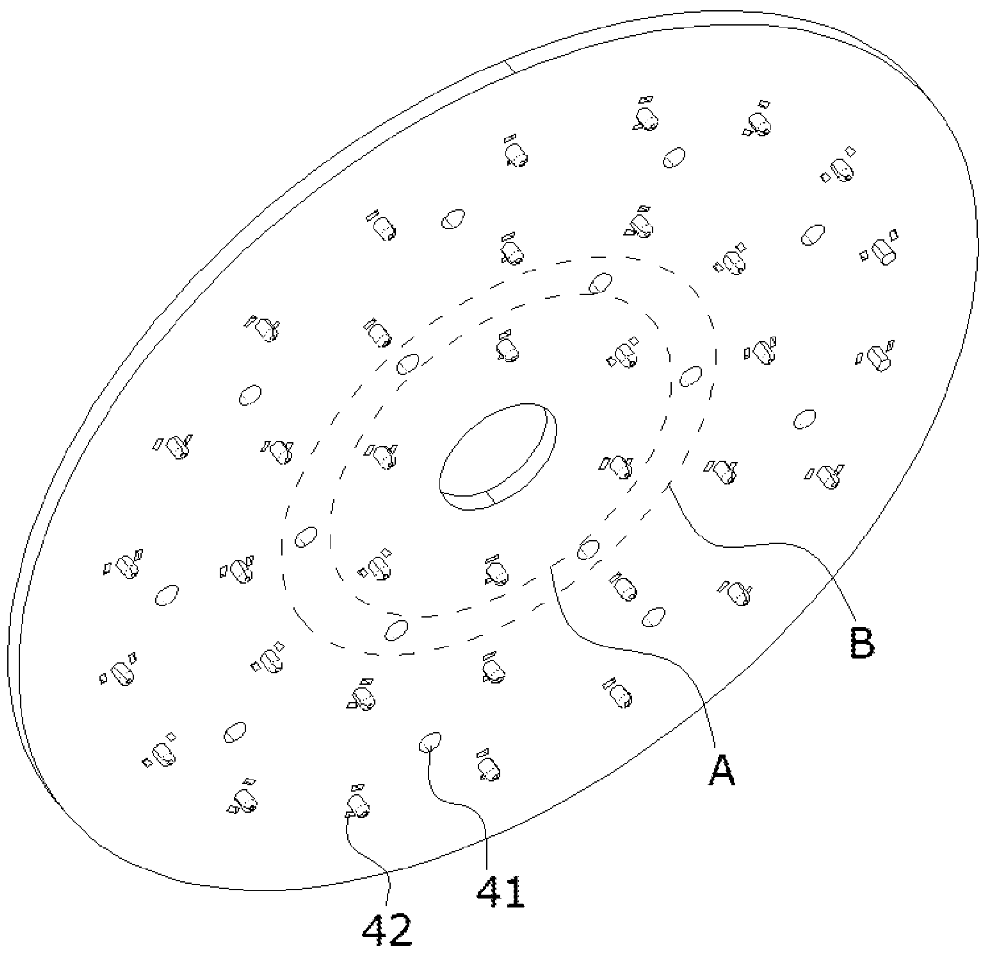
FIG. 5 is a structural schematic diagram of a water oblique assembly according one embodiment of the present disclosure.

Referring to FIG. 5, the straight flow region B and the oblique flow region A may be arranged in an alternating manner, rather than each is concentrated in one same region. The alternating manner helps to make the outlet water more uniform, so that the water evenly flows out from various positions. Moreover, the second water separation holes 32 are arranged in a direct alignment manner, which avoids the water flows from mixing due to the alternating manner.

Figure 10:
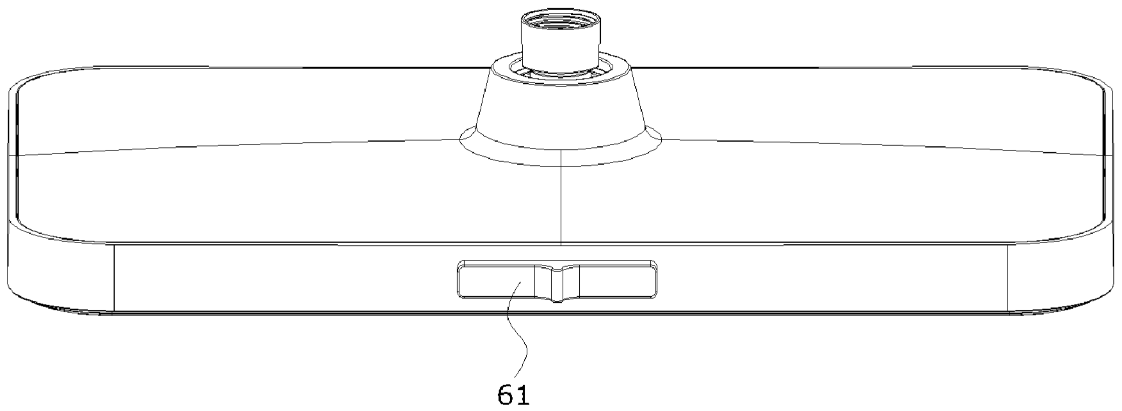
FIG. 10 is a structural schematic diagram of a fourth switching assembly according one embodiment of the present disclosure.

Referring to FIG. 10, in other embodiments, the housing 1, the water dispersion assembly 2, the water separation assembly 3 and the water oblique assembly 4 may have a square or polygonal shape, and they are not limited to the circular shape in the present disclosure. Under the premise that each structure exists, the shape does not form a specific limitation to the present disclosure.

Referring to FIG. 1, in an embodiment, the switching assembly 6 disposed at the water inlet of the housing 1 is a hand wheel 61. The water distributor 62 is rotated by rotating the hand wheel 61, so as to allow the pressurized water to enter through the first water inlet hole 11, or through the second water inlet hole 12, or through the first water inlet hole 11 and the second water inlet hole 12 at the same time. Sealing ring structures outside the water distributor 62 and the hand wheel 61 are arranged in a conventional manner, which is not detailed herein.

Figure 9:
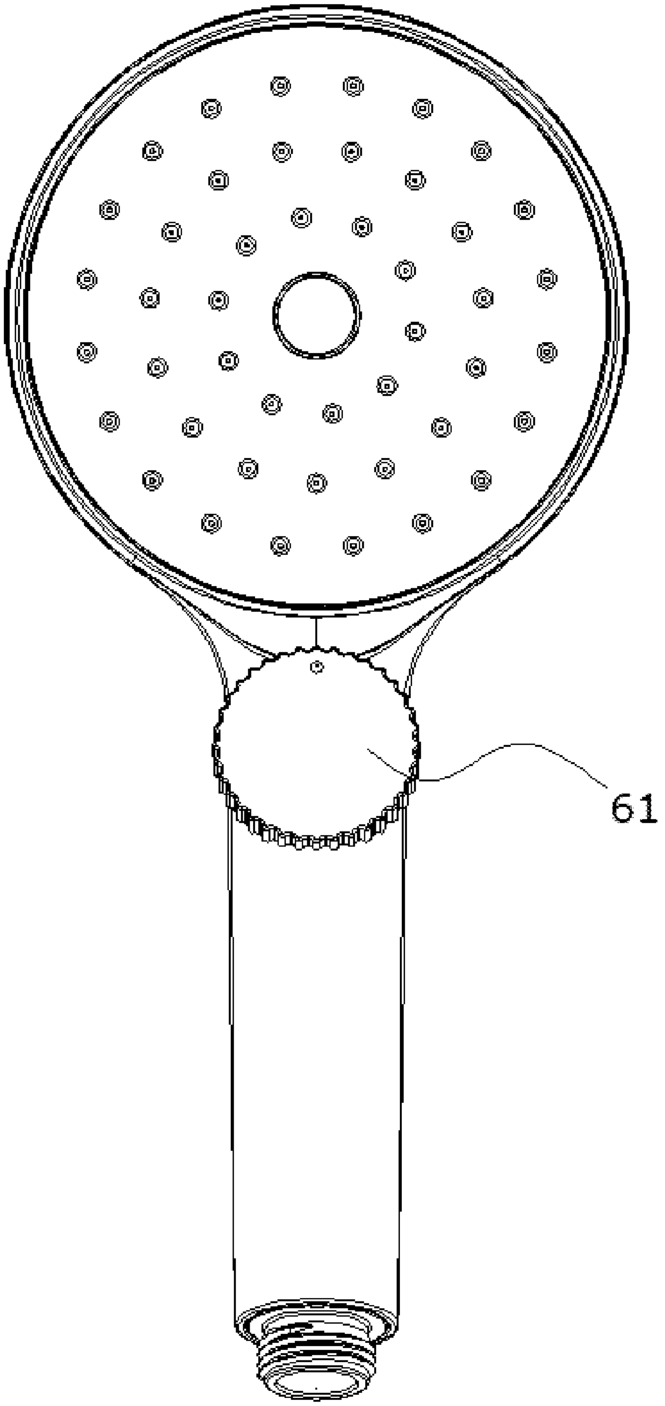
FIG. 9 is a structural schematic diagram of a third switching assembly according one embodiment of the present disclosure.

Referring to FIG. 9, in another embodiment, the switching assembly 6 may be other rotating component different from the hand wheel 61, such as a rotating disc, a rotating handle, etc., which is capable of driving the water distributor 62 to rotate and thereby switching different water inlets.

Figure 7:
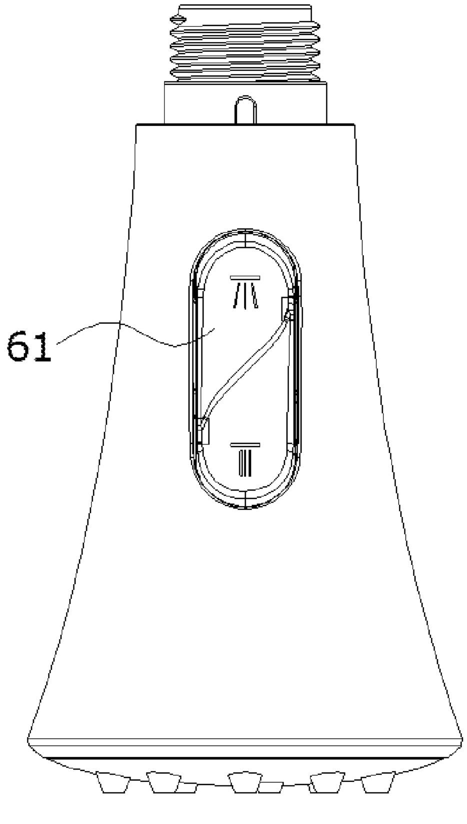
FIG. 7 is a structural schematic diagram of a second switching assembly according one embodiment of the present disclosure.
Figure 8:
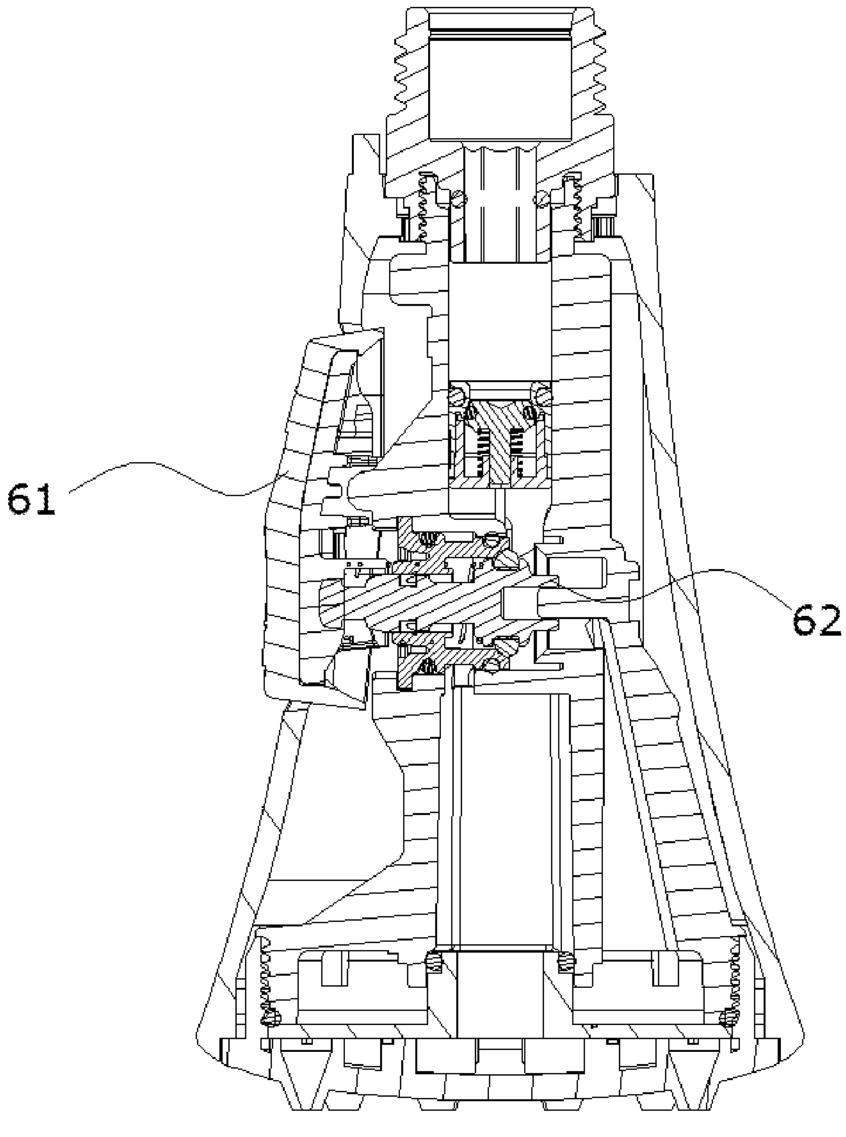
FIG. 8 is a cross-sectional schematic diagram of FIG. 7.

Referring to FIG. 7 to FIG. 8, in other embodiments, the switching assembly 6 may be implemented as a button. A water dispersion portion is pushed to move via the button, so as to switch different water inflow channels.

In still other embodiments, the switching assembly 6 may be implemented as a push switch. The water dispersion part is pushed to move via the switch, so as to switch different water inflow channels.

In an embodiment, the present disclosure further provides a shower, including a handle. The switching assembly 6 is disposed in the handle. The handle is threaded to the housing 1. Different water inlet modes are switched via the switching assembly 6 in the handle, thereby allowing the shower to generate different spray patterns.

In other embodiments, the water outlet structure allowing a nozzle to generate different spray patterns may be applied to a shower head or other water outlet device, so as to enable the shower head and other water outlet device to generate different spray patterns.

The foregoing description is merely preferred embodiments of the present disclosure, and is not intended to limit the present disclosure. Those skilled in the art may make various modifications and changes to the present disclosure. Any modification, equivalent replacement, improvement, etc. made within the spirit and principle of the present disclosure shall fall in the protection scope of the present disclosure.

What is claimed is:

1. A water outlet structure allowing a nozzle to generate different spray patterns, comprising:
 a housing;
 a water outlet cover;
 a water dispersion assembly;
 a water separation assembly;
 a water oblique assembly; and
 a switching assembly;
 wherein at least two water inlet holes are defined through the housing;
 the water outlet cover is connected to the housing, and a plurality of water outlet portions are defined through the water outlet cover;
 the water dispersion assembly comprises a first water dispersion hole in communication with a first water inlet hole of the at least two water inlet holes, and a second water dispersion hole in communication with a second water inlet hole of the at least two water inlet holes;

the water separation assembly is configured to direct pressurized water into a first chamber or into a second chamber;

the water oblique assembly forms the first chamber with the water separation assembly, and forms the second chamber with the water outlet cover;

the water oblique assembly comprises a straight flow region and an oblique flow region disposed on a same plane;

the pressurized water flows into the water separation assembly through the second water dispersion hole, directly flows into the second chamber through the straight flow region, and flows out from the water outlet portions through the second chamber, to form a first water flow;

the pressurized water flows into the water separation assembly through the first water dispersion hole, flows into the oblique flow region through the first chamber, swirls inside of the water outlet portions after flowing through the oblique flow region, and flows out from the water outlet portions, to form a second water flow; and the pressurized water enters the first chamber and the second chamber respectively through the first water dispersion hole and the second water dispersion hole, swirling water after flowing through the oblique flow region and straight-flow water after flowing through the straight flow region mix with each other and flow out from the water outlet portions, to form a third water flow; and the switching assembly is configured to selectively direct the pressurized water into the water inlet holes.

2. The water outlet structure allowing the nozzle to generate different spray patterns according to claim 1, wherein the oblique flow region comprises a plurality of oblique flow groups;

wherein each of the plurality of the oblique flow groups comprises two or more water oblique holes, and the water oblique holes are defined obliquely with respect to a water outlet surface or a horizontal plane and point to an end of the water outlet portions.

3. The water outlet structure allowing the nozzle to generate different spray patterns according to claim 2, wherein the water oblique holes are arranged in a staggered manner, and a water outlet end of each of the plurality of the oblique flow groups is in communication with one of the water outlet portions.

4. The water outlet structure allowing the nozzle to generate different spray patterns according to claim 3, wherein a pillar is disposed between the water oblique holes of each of the plurality of the oblique flow groups and vertical to the water oblique assembly, and an axis of the pillar and an axis of the water outlet portion corresponding to the oblique water group lie on a same straight line.

5. The water outlet structure allowing the nozzle to generate different spray patterns according to claim 1, wherein at least a plurality of water inlet notches in communication with the second chamber are defined at water inlet ends of the water outlet portions.

6. The water outlet structure allowing the nozzle to generate different spray patterns according to claim 3, wherein water inlet areas of the water oblique holes are larger than areas of water outlet holes of the water outlet portions.

7. The water outlet structure allowing the nozzle to generate different spray patterns according to claim 1, wherein the water dispersion assembly comprises a partition piece;

wherein the partition piece is closely attached to the water separation assembly, to form an accommodation space;

the first water dispersion hole is defined inside the accommodation space, and the second water dispersion hole is defined outside the accommodation space.

8. The water outlet structure allowing the nozzle to generate different spray patterns according to claim 7, wherein the water separation assembly comprises a plurality of first water separation holes and a plurality of second water separation holes;

wherein the first water separation holes are defined in an orthographic projection area of the accommodation space, and the second water separation holes are defined outside the orthographic projection area of the accommodation space and configured to receive water entering through the second water inlet hole.

9. The water outlet structure allowing the nozzle to generate different spray patterns according to claim 1, wherein the switching assembly comprises:

a water distributor, disposed at a water inlet end of the housing; and an on-off switch, configured to activate the water distributor;

wherein the on-off switch is configured to rotate or move the water distributor, so as to allow the water distributor to selectively direct water at the water inlet end into either of the water inlet holes or into the two water inlet holes at the same time.

10. A water outlet device, comprising:

the water outlet structure according to claim 1; and a connection housing;

wherein the switching assembly is disposed in the connection housing, and is configured to control the water outlet structure to jet different spray patterns.

* * * * *